(12) United States Patent
Menard

(10) Patent No.: US 6,933,987 B2
(45) Date of Patent: *Aug. 23, 2005

(54) MULTI CHANNEL IMAGING ENGINE APPARATUS

(75) Inventor: Jean Pierre Menard, Fremont, CA (US)

(73) Assignee: Aurora Systems, Inc., San Jose, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 10/079,789

(22) Filed: Feb. 19, 2002

(65) Prior Publication Data

US 2002/0130978 A1 Sep. 19, 2002

Related U.S. Application Data

(63) Continuation of application No. 09/483,888, filed on Jan. 18, 2000, now Pat. No. 6,377,318.

(51) Int. Cl.[7] .............................. H04N 5/74; H04N 9/31
(52) U.S. Cl. ....................... 348/745; 348/790; 348/794; 349/7
(58) Field of Search ................................ 348/745, 750, 348/751, 756, 757, 759, 760, 766, 789, 790, 794; 349/7, 8, 9, 58; 353/119; 359/819; H04N 5/74, 9/31

(56) References Cited

U.S. PATENT DOCUMENTS

| 4,943,154 | A | * | 7/1990 | Miyatake et al. | 353/31 |
|---|---|---|---|---|---|
| 5,191,450 | A | * | 3/1993 | Yajima et al. | 349/8 |
| 5,418,586 | A | * | 5/1995 | Fujimori et al. | 353/122 |
| 5,453,859 | A | * | 9/1995 | Sannohe et al. | 349/9 |
| 5,724,160 | A | * | 3/1998 | Brandestini et al. | 358/475 |
| 5,743,610 | A | * | 4/1998 | Yajima et al. | 353/31 |
| 5,905,540 | A | * | 5/1999 | Miyashita et al. | 348/674 |
| 5,909,944 | A | * | 6/1999 | Yajima et al. | 353/81 |
| 5,918,961 | A |   | 7/1999 | Ueda |  |
| 5,988,818 | A | * | 11/1999 | Fujimori et al. | 353/119 |
| 6,095,653 | A | * | 8/2000 | Yajima | 353/33 |
| 6,097,546 | A | * | 8/2000 | Yoshii et al. | 359/649 |
| 6,115,084 | A | * | 9/2000 | Miyashita et al. | 348/792 |
| 6,139,154 | A | * | 10/2000 | Haba | 353/31 |
| 6,185,052 | B1 | * | 2/2001 | Fujimori et al. | 359/819 |
| 6,227,670 | B1 | * | 5/2001 | Numazaki et al. | 353/31 |
| 6,320,709 | B1 | * | 11/2001 | Kitabayashi et al. | 359/831 |
| 6,345,895 | B1 | * | 2/2002 | Maki et al. | 353/33 |
| 6,384,890 | B1 | * | 5/2002 | Takiar et al. | 349/150 |
| 6,416,187 | B1 | * | 7/2002 | Menard | 353/122 |
| 6,464,360 | B2 | * | 10/2002 | Hattori et al. | 353/33 |
| 6,549,320 | B2 | * | 4/2003 | Fujimori | 359/246 |
| 6,597,346 | B1 | * | 7/2003 | Havey et al. | 345/169 |
| 6,636,276 | B1 | * | 10/2003 | Rosenbluth | 349/8 |

FOREIGN PATENT DOCUMENTS

EP 0837351 * 10/1997 ............ H04N/9/31

* cited by examiner

*Primary Examiner*—Brian P. Yenke
(74) *Attorney, Agent, or Firm*—Henneman & Saunders; Larry E. Henneman, Jr.

(57) ABSTRACT

A multi channel video engine (10) for accepting, dividing, modifying and recombining light to project an image. A housing (12) encloses an optical assembly (28) having a dichroic mirror assembly (58) and a color cube (60). A plurality of LCD assemblies (30) accept light from the dichroic mirror assembly (58), modifies it, and reflects it to the color cube (60). A lens assembly (16) is affixed to a bulkhead (24) of the housing (12) using a lens cradle (14) and lens retainer (18). An output prism (54) aligns light onto a second plane (70) to coincide with an optical axis (72) of the lens assembly (16).

21 Claims, 6 Drawing Sheets

MULTI CHANNEL IMAGING ENGINE APPARATUS

RELATED APPLICATIONS

This application is a continuation of U.S. Patent application Ser. No. 09/483,888, filed Jan. 18, 2000 now U.S. Pat. No. 6,377,318 by the same inventor, which is incorporated herein by reference in its entirety.

TECHNICAL FIELD

The present invention relates to the field of multi channel imaging devices, and more particularly to projection type imaging devices, wherein it is very important to accurately align physical components of the apparatus such that the color components of a resulting image will be aligned. The predominant current usage of the present inventive multi channel imaging engine is as a component of projection video display devices, wherein it is desirable to have a rugged and accurately aligned electro-optical unit for projecting well aligned color images therefrom.

BACKGROUND ART

The typical arrangement for multi-channel imaging systems will have a clamshell arrangement where the internal optics and components are assembled from above and the optical cavity is split along a horizontal plane into two halves. However, the construction of such a device results in two or more assembly planes. For example, at least one is horizontal for the placement of the splitting and combining optics, and at least one is vertical for the placement of the projection optics. This requires complex molded parts with expensive tooling. Since there are two or more assembly planes, the registration of the optics becomes more difficult. This problem is made worse in an off-axis design where the optics are not all on the same plane.

It would be desirable to have a multi-channel imaging system wherein the alignment problems discussed above are ameliorated. It would be of further benefit if such a device were sufficiently rigid to prevent distortion problems caused by flexing and vibration. However, such a solution, in order to be practical, should be inexpensive to produce and inexpensive to use in the production of a final multi channel image projection system.

To the inventor's knowledge, all previous apparatus or methods for producing a multi channel imaging engine have been difficult and/or expensive to manufacture and assemble, less than optimally rigid, and difficult to align and use.

DISCLOSURE OF INVENTION

Accordingly, it is an object of the present invention to provide a video projection engine that will provide sub-pixel accuracy over an entire image range.

It is still another object of the present invention to provide a video projection engine which is simple to construct and wherein components are readily aligned.

It is yet another object of the present invention to provide a video projection engine wherein there are no problems of mis-convergence due to twisting or bending of the optical housing.

It is still another object of the present invention to provide a video projection engine wherein artifacts from vibration introduced from external sources is minimized.

It is yet another object of the present invention to provide a video projection engine which is inexpensive to produce.

It is still another object of the present invention to provide a video projection engine which can be used with inexpensive auxiliary components.

It is yet another object of the present invention to provide a video projection engine which is inexpensive to install and align.

Briefly, an embodiment of the present invention is an assembly of mechanical components that aligns, supports and houses the optical, opto-mechanical and electronic components of a three color projection system. The architecture is executed in such a way that it solves many of the problems that are associated with high resolution multi-channel imaging systems. The total cost of the components is reduced because the number of components is less and the parts can be manufactured with high volume, low cost processes. The inter-channel stiffness and the mechanical stability between the individual color channels is superior to previous approaches. This is a direct consequence of the novel approach for enclosing the multi-channel cavity. There is no optical alignment required other than convergence of the discreet images. The components are all self-aligning with very low cost registration features.

The invention has a housing that is constructed in such a way that the entire optical cavity is contained inside the single formed part. The cavity is enclosed with a bulkhead that serves as a frame to align and support the optics and opto-mechanics. There is only a single assembly plane that is the plane of the bulkhead. The splitter and combiner optics are attached to the bulkhead as well as the projection lens. The cavity is enclosed when the kernel housing is attached to the bulkhead. The kernel housing can be formed as a single piece and there are no secondary operations required. The bulkhead can be stamped or molded and the bracket that holds the splitter dichroics, the combiner prism, the polarizer/analyzer assembly, and/or any additional optical devices can be molded (also with no secondary operations). There is a novel focussing mount for the projection lens that allows for a simple, low cost, fixed focus lens.

An advantage of the present invention is that a relatively inexpensive video projection engine is provided for incorporation into video projection imaging devices.

A further advantage of the present invention is that sub-pixel accuracy is provided over an entire image.

Yet another advantage of the present invention is that effects of vibration are essentially eliminated, such that cooling fans can be mounted on the video projection engine without adverse effects.

Still another advantage of the present invention is that the rigidity of the video projection engine essentially eliminates problems of mis-convergence due to twisting or bending of the optical housing.

Yet another advantage of the present invention is that the video projection engine is rugged in construction and reliable in operation.

Still another advantage of the present invention is that it is inexpensive to produce.

Yet another advantage of the present invention is that it is inexpensive to install, align, and use.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

DETAILED DESCRIPTION OF THE INVENTION

Figure 1:
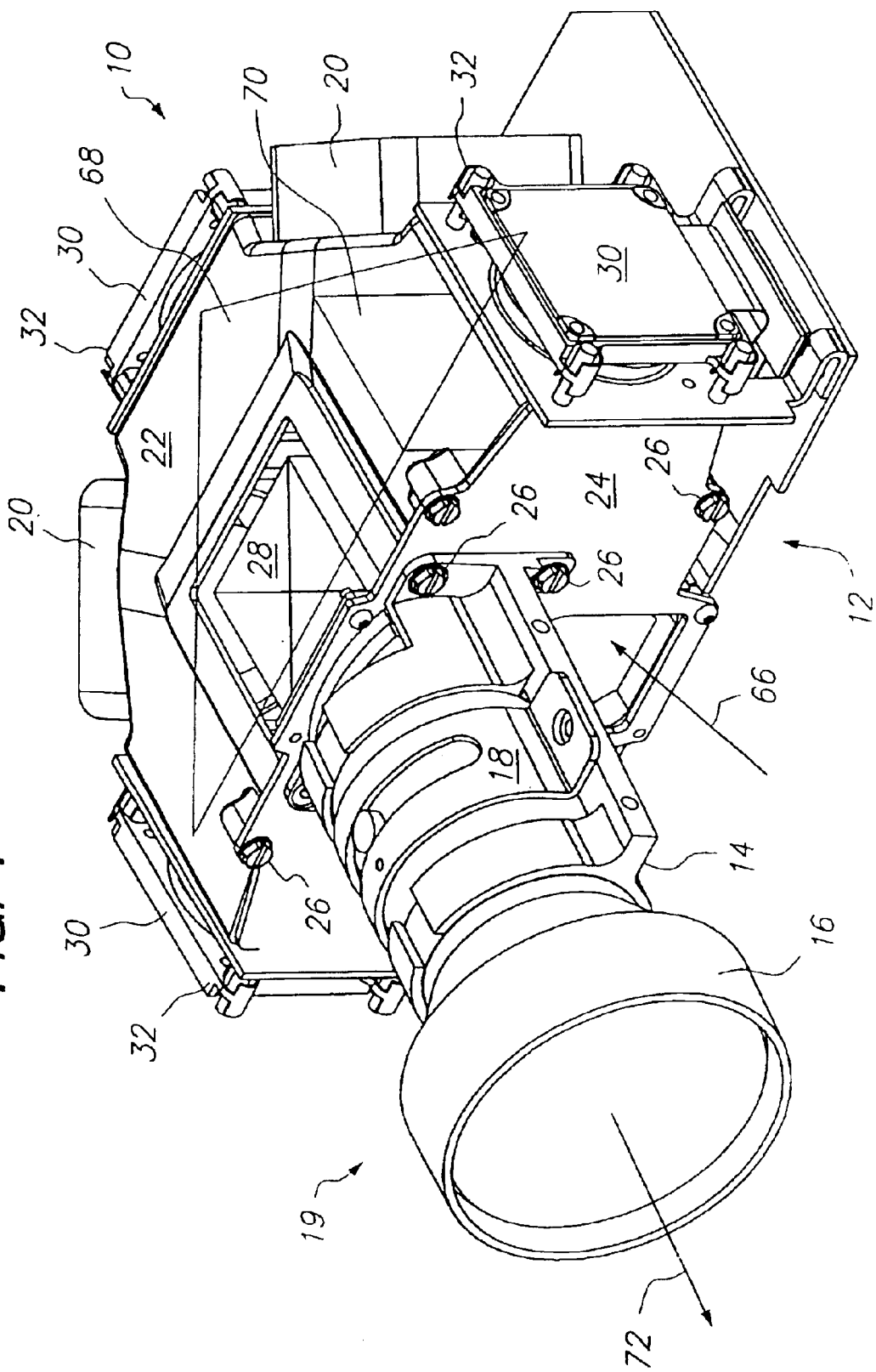
FIG. 1 is perspective view of a multi channel imaging engine according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

The mode for carrying out the invention, as described herein, is a multi channel imaging engine. An example of the inventive multi channel imaging engine is depicted in a perspective view in FIG. 1 and is designated therein by the general reference character 10. The multi channel imaging engine 10 has a housing 12 with a lens cradle 14 affixed thereto. The lens cradle 14 supports a lens assembly 16 which is held in place, thereon, by a lens retainer 18. The assembled lens cradle 14, lens assembly 16, and lens retainer 18 will be referred to, herein, as a lens unit 19.

This example of the invention has two cooling fans 20 affixed to the housing 12. While the cooling fans 20 are not a necessary part of the invention, it is instructive to note that the present inventive multi channel imaging engine 20 is sufficiently rigid that the cooling fans 20 can be mounted thereon without the adverse effects of vibration which would result from a less rigid device.

In this embodiment of the invention, the housing 12 has a kernel housing 22 and a bulkhead 24. The kernel housing 22 described herein is die cast from aluminum alloy, although other construction techniques including but not limited to alternative molding methods are within the scope of the invention. Another example of a construction technique would be to press form the housing from a single piece of sheet steel, or to cut and bend sheet metal into the desired shape. The bulkhead 24 is affixed to the kernel housing 22 by screws 26, as shown by way of example in the view of FIG. 1 such that an interior 27 of the housing 12 is generally enclosed by the bulkhead 24 and the kernel housing 22.

An optical assembly 28 is affixed to the bulkhead 24 within the housing 12, and three LCD assemblies 30 are affixed to the outside of the housing 12. The LCD assemblies 30 may optionally be of essentially any reflective type, wherein light projected onto one of the LCD assemblies 30 is modified according to an image electronically provided to the LCD assembly and the light, modified to conform to the image, is reflected therefrom. One skilled in the art will be familiar with such devices. In this present embodiment of the multi channel imaging engine 10, the LCD assemblies 30 are of the commercially available type. The LCD assemblies 30 are each affixed to the kernel housing 22 using an alignment mount 32 whereby the LCD assemblies 30 may be aligned, as necessary, during final assembly of the multichannel imaging engine 10. One skilled in the art will also be familiar with the alignment mount 32, and variations of such that are available.

Figure 2:
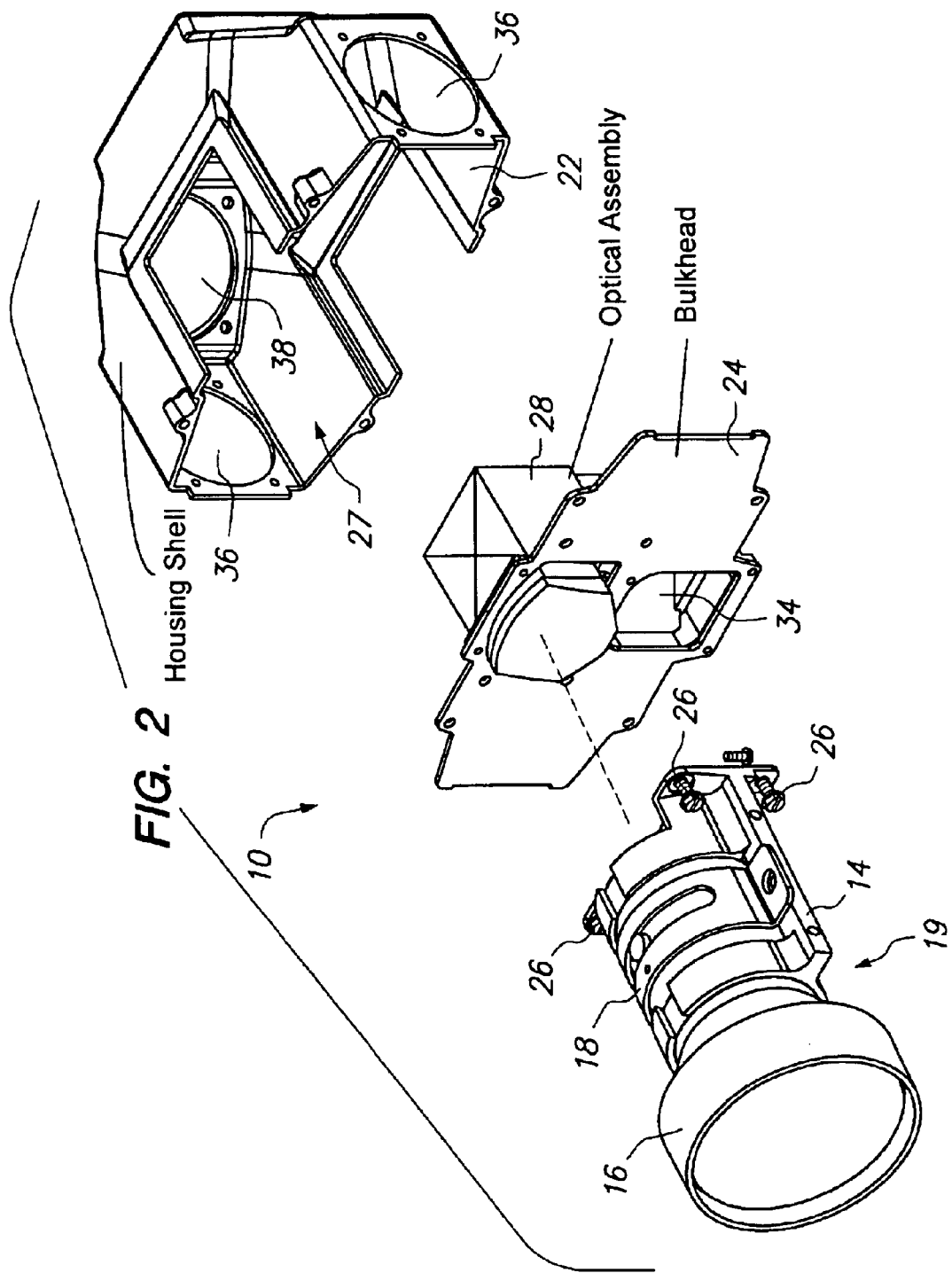
FIG. 2 is an exploded perspective view of the multi channel imaging engine of FIG. 1.

FIG. 2 is an exploded perspective view of a portion of the multichannel imaging engine 10 of FIG. 1. In the view of FIG. 2, it can be seen that the optical assembly 28 is affixed to the bulkhead 24. Also, in the view of FIG. 2 it can be seen that the lens cradle 14 has an additional plurality (three are visible in the view of FIG. 2) of the screws 26 for affixing the lens cradle 14 to the bulkhead 24.

A light entry port 34 can be seen in the bulkhead 24 wherethrough white light is introduced into the housing 12. Also visible in the view of FIG. 2 are two of the three LCD ports 36 wherethrough light is projected onto, and reflected form the LCD assemblies 30 (FIG. 1). One of the two cooling ports 38 of this embodiment of the invention, whereon the cooling fans 20 (FIG. 1) are affixed, is also visible in the view of FIG. 2.

Figure 3:
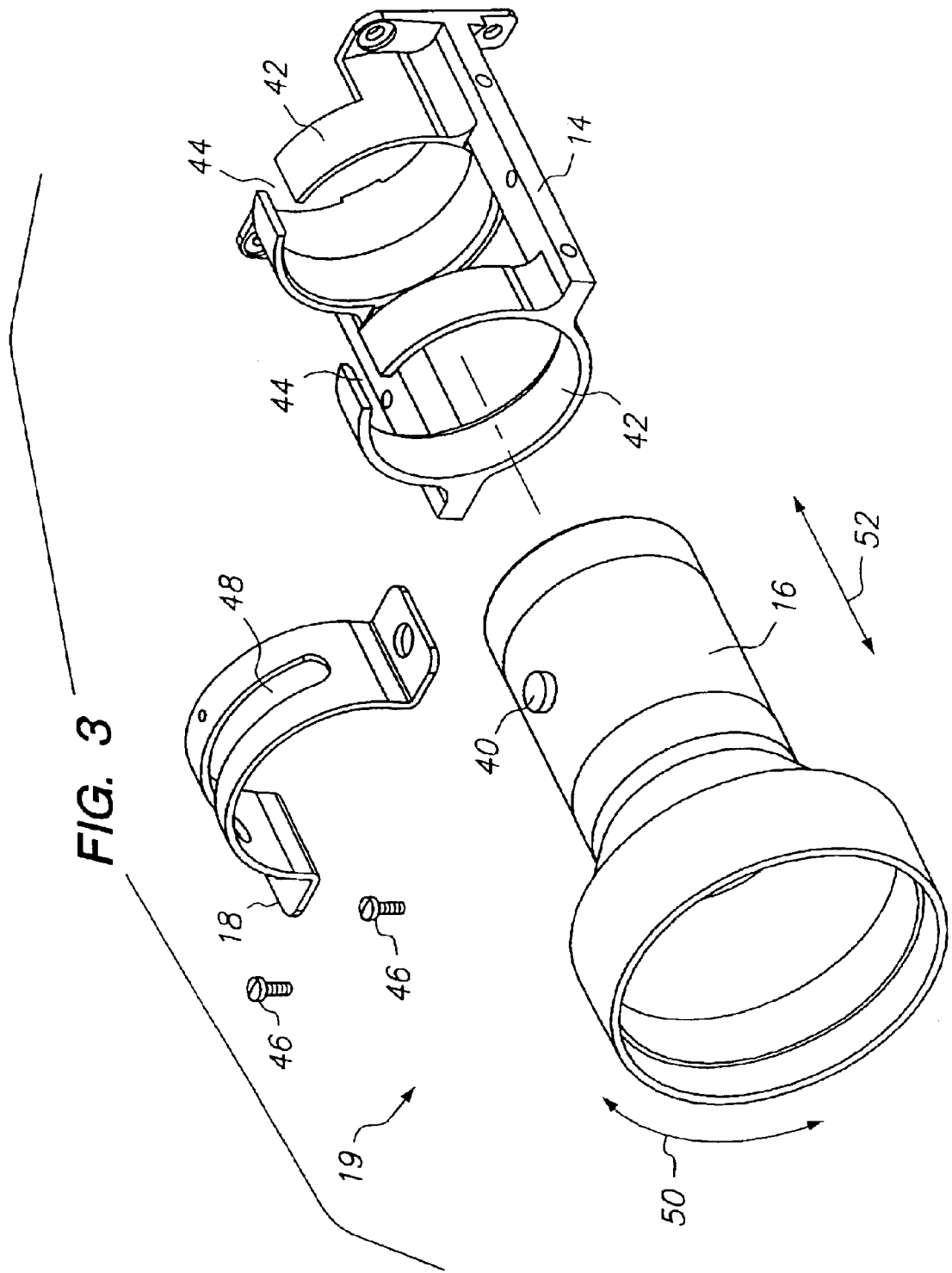
FIG. 3 is an exploded perspective view of the lens unit of FIGS. 1 and 2.

FIG. 3 is an exploded perspective view of the lens unit 19, previously discussed herein in relation to FIGS. 1 and 2. The fixed focus lens assembly 16 has a positioning projection 40, and the lens cradle 14 has two retaining rings 42 for accepting the lens assembly 16. Each of the retaining rings 42 has a gap 44 therein such that the lens assembly can be inserted into the lens cradle 14 with the positioning projection 40 aligned with the gaps 44. The lens assembly 16 is then secured in position in the lens cradle 14 by the lens retainer 18 using a pair of cap screws 46. As can be seen in the view of FIG. 3, a positioning slot 48 in the lens retainer 18 is angled such that, when the positioning projection 40 is within the positioning slot 48, the rotating the lens assembly 16 (with the cap screws 46 appropriately loosened), as indicated by arrow 50, will cause the fixed focus lens assembly 16 to move forward or backward in the lens cradle 14, as indicated by arrow 52, such that the lens assembly 16 can be focused, as required.

Figure 4:
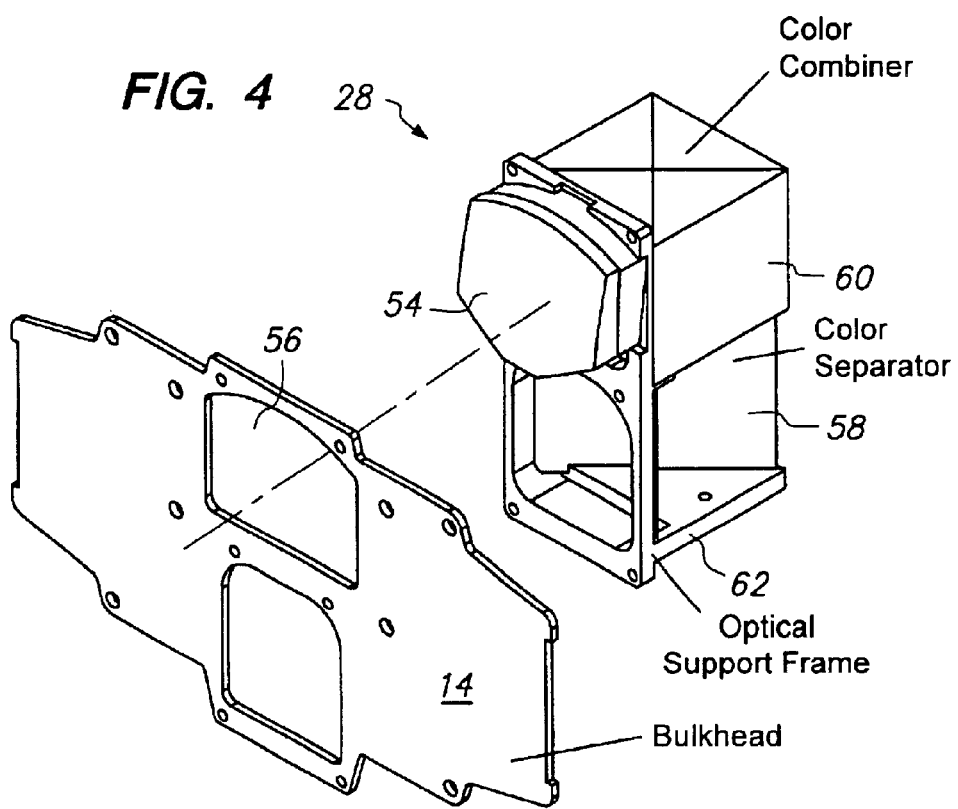
FIG. 4 is an exploded perspective view of the bulkhead and the optical assembly of FIGS. 1 and 2.

FIG. 4 is an exploded view of the bulkhead 14 and optical assembly 28 wherein the optical assembly 28 can be more readily viewed. As can be seen in the view of FIG. 2, an output truncated doublet 54 (which is effectively used as a prism for redirecting light) of the optical assembly 28 projects partially through a light exit port 56 in the bulkhead 14 when the optical assembly 28 is affixed to the bulkhead 14. Also visible in the view of FIG. 4 are a dichroic mirror assembly 58, and a color cube 60, which will be discussed in more detail, hereinafter. The output truncated doublet 54, the dichroic mirror assembly 58 and the color cube 60 are each affixed to an optical frame 62.

Figure 5:
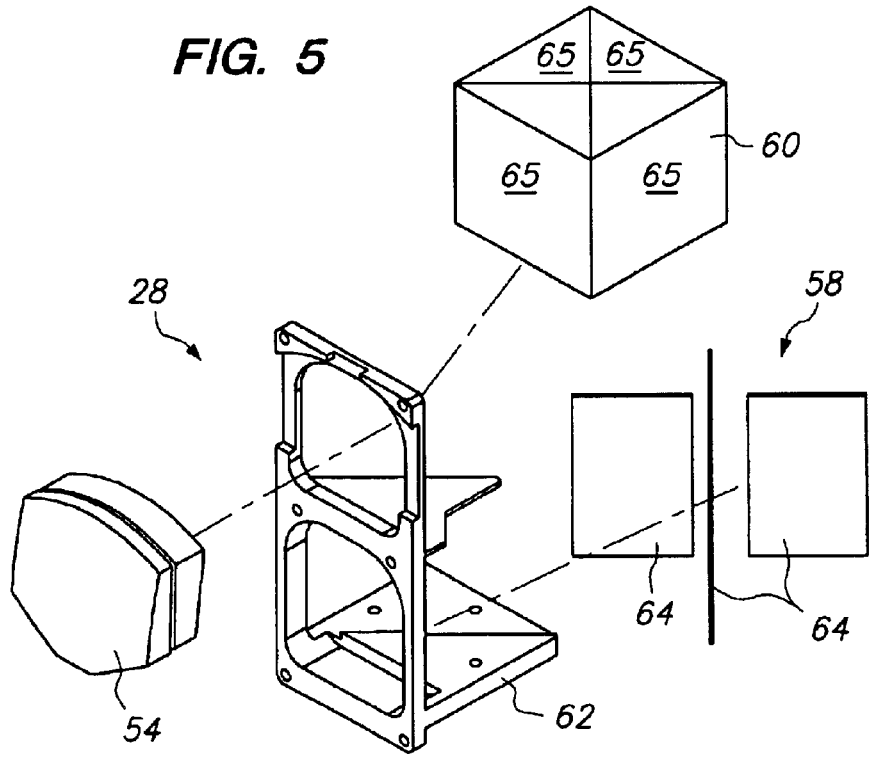
FIG. 5 is an exploded perspective view of the optical assembly of FIGS. 1, 2 and 4.

FIG. 5 is an exploded perspective view of the optical assembly 28, according to this presently described embodiment of the invention. One skilled in the art will recognize that the dichroic mirror assembly 58 has three dichroic mirrors 64 arranged in an "X" configuration such that white light projected onto the dichroic mirror assembly 58 is divided into its three basic component wavelength colors, with one of each such colors being directed toward a corresponding one of the LCD assemblies 30 (FIG. 1). One skilled in the art will also recognize that the color cube 60 is made up of four color cube prisms 65 with the contiguous surfaces thereof having dichroic surfacing such that three primary color light beams reflected from the three LCD assemblies 30 are recombined and directed toward the output truncated doublet 54.

It is important to note that, in this embodiment of the invention, light us directed slightly upward (from a perspective where the color cube 60 is above the dichroic mirror assembly 58) as light enters the housing 12 through the light entry port 34 (FIG. 2), as indicted by a light input path arrow 66 in FIG. 1. Accordingly, as light travels through the multi channel imaging engine 10, the light is divided by the dichroic mirror assembly 58, modified by and reflected from the LCD assemblies 30, and recombined by the color cube 60 relative to a first plane 68. The light is also moving relative to a second plane 70 (generally upward, as discussed previously herein) such that the light first passes through the dichroic mirror assembly 58, is then reflected at an upward angle from the LCD assemblies 30, and then passes through, and is recombined by, the color cube 60. Since an optical axis 72 of the lens assembly 16 is aligned generally along the first plane 68, the output truncated doublet 54 is shaped and configured to realign the (slightly upward canted) light with the optical axis 72 of the lens assembly 16.

Accordingly, the described embodiment of the multi channel imaging engine 10 is assembled generally as follows; The optical assembly 28 is assembled as described herein and affixed to the bulkhead 24. The bulkhead is affixed to the kernel housing 22 generally enclosing the interior 27 thereof. The LCD assemblies 30 are affixed to the exterior of the kernel housing 22, using the alignment mounts 32, as previously described herein. In this manner, the bulkhead 24 and the kernel housing 22 serve as mounting means for mounting the optical assembly 28 with respect to the LCD assemblies 30. Except as otherwise stated, or as may be necessitated by a particular application or variation of the invention, the order of assembly operations is not critical and is not an inherent part of the invention.

Figure 6:
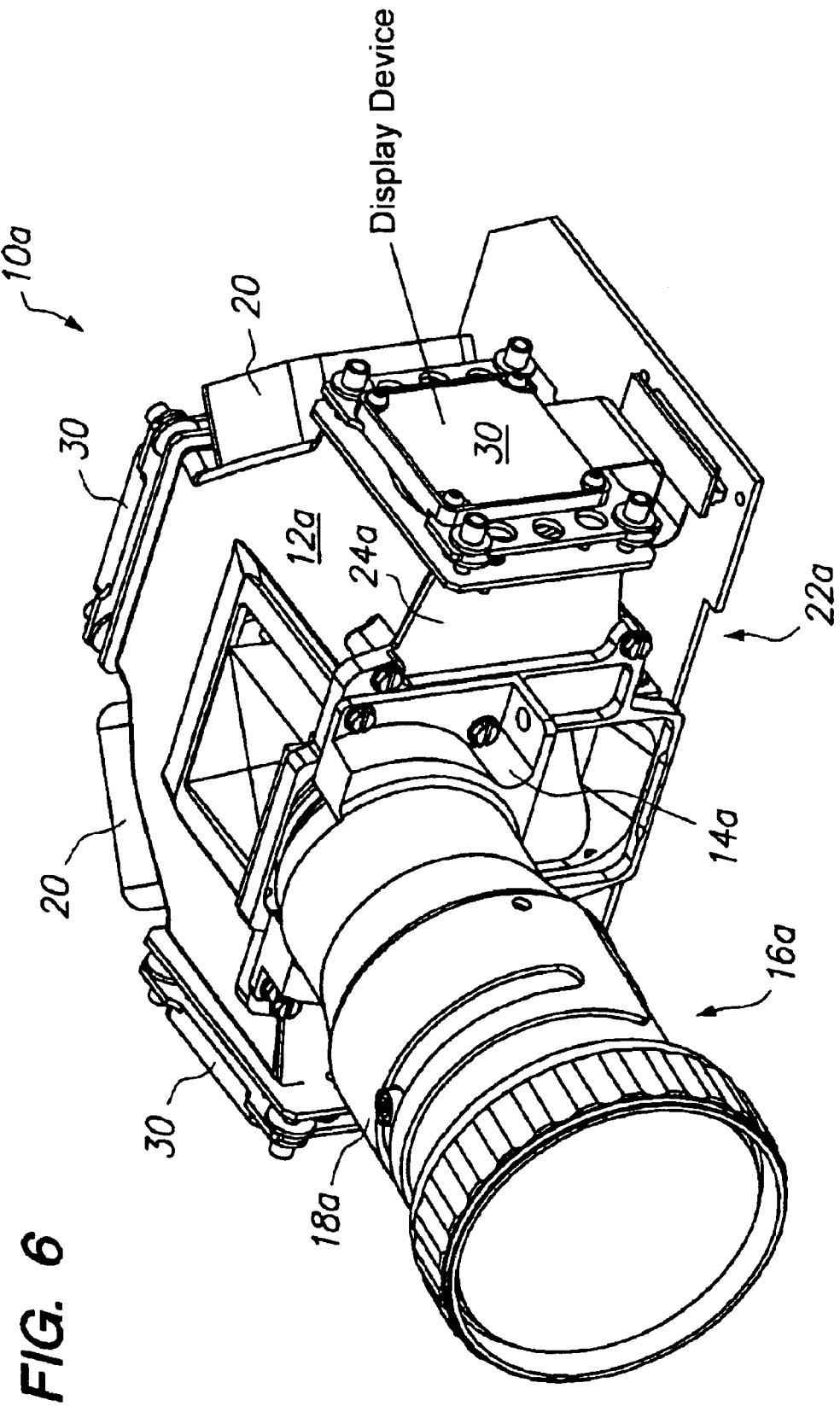
FIG. 6 is a perspective view of another embodiment of a multi channel imaging engine according to the present invention.

Another embodiment of the multi channel imaging engine is depicted in a perspective view in FIG. 6 and is designated therein by the general reference character 10*a*. This embodiment of the multi channel imaging engine 10*a* is not greatly different in kind and in components from the previously described multi channel imaging engine 10, previously described herein. The multi channel imaging engine 10*a* is presented here in order to illustrate some possible variations in shape and construction as described herein and as depicted in the drawings. As can be seen in the view of FIG. 6, the multi channel imaging engine 10*a* has a housing 12*a* with a lens cradle 14*a* affixed thereto. The lens cradle 14*a* supports a lens assembly 16*a* which is held in place, thereon, by a lens retainer 18*a*. The assembled lens cradle 14*a*, lens assembly 16*a*, and lens retainer 18*a* will be referred to, herein, as a lens unit 19*a*. As can be seen in the view of FIG. 6, two of the cooling fans 20 are affixed to the housing 12*a* in this embodiment of the invention, as well.

In this embodiment of the invention, also, the housing 12*a* has a kernel housing 22*a* and a bulkhead 24*a*, each of which are constructed by methods similar to those previously described in relation to the first described embodiment of the invention, herein, and shaped as shown in the view of FIG. 6 and the subsequent figures of the drawing.

An optical assembly 28*a* is affixed to the bulkhead 24, within the housing 12*a*, and three LCD assemblies 30, which are not significantly different from the LCD assemblies 30 previously described herein, are affixed to the outside of the housing 12*a*. The bulkhead 24*a* and the kernel housing 22*a* when fixed to each other, provide mounting means for mounting the optical assembly 28*a* with respect to the LCD assemblies 30.

Figure 7:
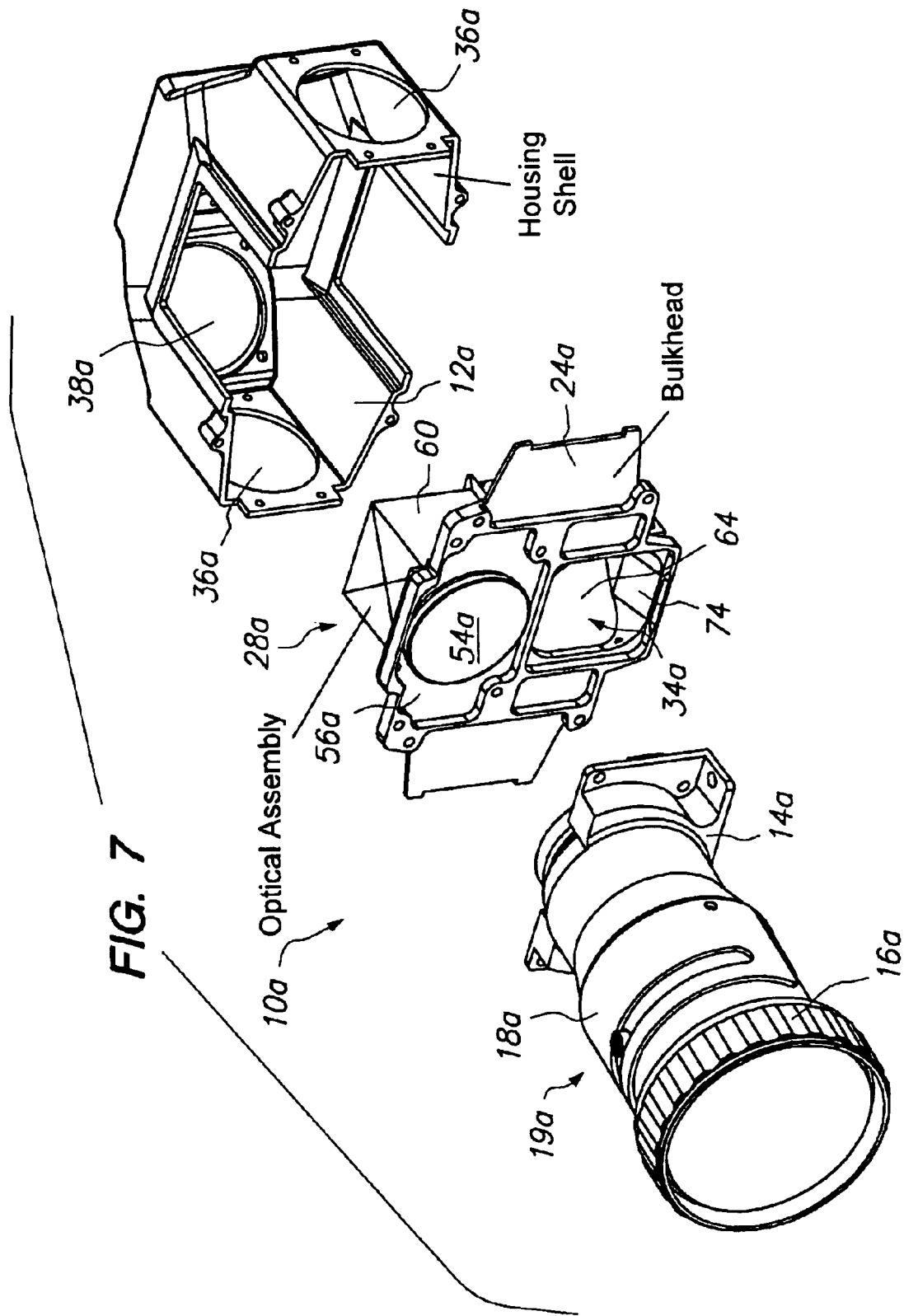
FIG. 7 is an exploded perspective view of the example of the multi channel imaging engine of FIG. 6.

FIG. 7 is an exploded perspective view of a portion of the multichannel imaging engine 10*a* of FIG. 6. In the view of FIG. 7, it can be seen that the optical assembly 28*a* is affixed to the bulkhead 24*a*. Indeed, in this embodiment of the multi channel imaging engine 10, the components of the optical assembly 28*a* are affixed directly to the bulkhead 24*a*, as will be discussed in more detail, hereinafter. In this embodiment also, a light entry port 34*a* can be seen in the bulkhead 24*a* wherethrough white light is introduced into the housing 12*a*. Also visible in the view of FIG. 7 are two of the three LCD ports 36*a* wherethrough light is projected onto, and reflected form the LCD assemblies 30 (FIG. 6). One of two cooling ports 38*a* of this embodiment of the invention, whereon the cooling fans 20 (FIG. 6) are affixed, is also visible in the view of FIG. 7. The fixed focus lens assembly 16*a*, the lens cradle 14*a*, and the lens retainer 18*a* function much like the fixed focus lens assembly 16 and the lens cradle 14 previously discussed herein in relation to FIG. 3, although the actual shape is somewhat different, as can be seen by comparison of the views of FIGS. 2 and 7.

As can be seen in the view of FIG. 7, an output doublet 54*a* is positioned in relation to a light exit port 56*a*, and performs functions previously as described herein in relation to the truncated doublet 54 of the previously described embodiment.

In this presently described embodiment 10*a* of the present invention, the dichroic mirrors 64 are assembled within a mirror receptacle 74 which is formed as a part of the bulkhead 24*a*, and the color cube 60 is affixed to the bulkhead 24*a*. The dichroic mirrors 64 and the color cube 60 are essentially the same as, and function in an similar manner to like elements previously discussed herein in relation to the first described embodiment 10 of the invention.

Various modifications may be made to the invention without altering its value or scope. For example, the housing 12 could be molded and/or made from another material.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive multi channel imaging engine 10 is intended to be widely used in the production of video image projection systems such as high resolution projection television devices, and particularly computer video output projection display devices. The invention allows convergence to sub-pixel accuracy over the entire image. The assembly is simplified by the self-aligning features and there is no alignment of optics other than the convergence of the three image channels. The inter-channel stiffness is substantially high so that there are no problems of misconvergence due to twisting or bending of the optical housing. There is a substantial cost advantage because the construction of the mechanics allows for simple molded and stamped parts with no secondary machining operations. The focussing mount can be molded and allows the projection lens to be purchased as a low cost fixed focus lens.

This mechanical architecture is a departure from the typical method of projection system assembly. It permits low cost system solutions, especially with (but not exclusive to) off-axis projection systems. This will allow off-axis reflective projection systems to complete effectively in the market for high resolution, low cost display systems.

One skilled in the art will readily understand the alignment procedures used in conjunction with the present invention. For example, the alignment mounts 32 are used to adjust the LCD assemblies such that the three color component images properly align when recombined in the color cube 60. Similarly, the lens retainer 18 will be loosened and the lens assembly rotated, as briefly discussed herein before, to properly adjust the focal aspect of the lens assembly 16.

Since the multi channel video projection engine 10 of the present invention may be readily produced and integrated with existing video creation and display systems and devices, and since the advantages as described herein are provided, it is expected that it will be readily accepted in the industry. For these and other reasons, it is expected that the utility and industrial applicability of the invention will be both significant in scope and long-lasting in duration.

I claim:

1. A projection system comprising:
   a housing shell;
   a plurality of display devices fixed to said housing shell;
   an optical support frame fixed to said housing shell, said optical support frame defining a first opening and a second opening;
   a color separator disposed adjacent said first opening or receiving an illumination beam through said first opening, for dividing said illumination beam into a plurality of colored beams, and for directing each of said colored beams toward an associated one of said display devices; and
   a color combiner disposed adjacent said second opening for receiving said colored beams from said display devices, for recombining said colored beams to form a projection beam, and for directing said projection out through said second opening.

2. A projection system according to claim 1, wherein:
   said first opening and said second opening lie in the same plane; and
   said frame includes a front portion defining said openings and platform extending rearward from said front portion for supporting said color separator.

3. A projection system according to claim 2, wherein:
   said color separator includes dichroic plates; and
   said platform includes registration features for mounting said dichroic plates in a crossed configuration.

4. A projection system according to claim 3, wherein:
   said color combiner includes a color cube; and
   said frame further includes a second platform extending rearward from below said second opening for supporting said color cube.

5. A projection system according to claim 1, wherein:
   said first opening and said second opening lie in a vertical front plane, with said first opening and said second opening disposed along vertical line;
   one of said display devices lying in a rear vertical plane roughly parallel to said vertical front plane;
   a second one of said display devices lying in a first lateral vertical plane roughly perpendicular to said front vertical plane; and
   a third one of said display devices lying in a second lateral vertical plane spaced apart from and roughly parallel to said first lateral vertical plane.

6. A projection system according to claim 5, wherein said display devices are centered on a horizontal plane lying above the center of said first opening and below the center of said second opening.

7. A projection system according to claim 1, further including a bulkhead mounted to said housing shell, said optical support frame mounted to said housing shell via said bulkhead.

8. A projection system according claim 1, wherein:
   said housing shell defines a roughly planar front opening;
   a bulkhead includes at least one opening to facilitate passage of said illumination beam and said projection beam, and is fixed to said housing shell at said front opening; and
   said frame is fixed to said bulkhead at said at least one opening.

9. A projection system according to claim 8, wherein said optical support frame is formed as an integral part of said bulkhead.

10. A projection system according to claim 8, further comprising an optical lens mounted to said frame.

11. A projection system according to claim 10, wherein a portion of said optical lens and a complementary edge of said at least one opening in said bulkhead form an alignment registration feature between said frame and said bulkhead.

12. A projection system comprising.
    a housing shell defining a roughly vertical front opening;
    a plurality of display devices fixed to said housing shell;
    a bulkhead mounted to said vertical front opening of said housing shell;
    a color separator mounted to said bulkhead; and
    a color combiner mounted to said bulkhead.

13. A projection system according claim 12, wherein:
    said color separator includes a plurality of dichroic plates; and
    said bulkhead includes a mirror receptacle formed to accept said dichroic plates in a crossed configuration such that an edge of one of said plurality of dichroic plates is adjacent the center of another one of said plurality of dichroic plates.

14. A projection system according to claim 13, wherein said color combiner comprises a color cube.

15. A projection system according to claim 12, further including;
    an illumination source disposed on an opposite side of said bulkhead with respect to said color separator; and
    a projection lens disposed on the same side of said bulkhead as said illumination source.

16. A projection system according to claim 15, wherein said projection lens is fixed to said bulkhead.

17. A projection system according to claim 15, wherein:
    said display devices are centered on a plane; and
    said illumination source is disposed adjacent said plane to deliver said illumination beam to said color separator at an oblique angle with respect to said plane.

18. A projection system according to claim 17, wherein:
said plane is a horizontal plane; and
said illumination source is disposed beneath said horizontal plane.

19. A projection system according to claim 12, wherein said color separator and said color combiner are centered on a common axis.

20. A projection system comprising;
a plurality of display devices;
an optical assembly including a color separator and a color combiner; and
mounting means for mounting said optical assembly with respect to said display devices.

21. A projection system according to claim 20, wherein said mounting means comprises:
a housing shell fixed to said display devices; and
a bulkhead fixed to said housing shell, said optical assembly fixed to said bulkhead.

* * * * *